(12) United States Patent
Peuchert et al.

(10) Patent No.: US 7,710,656 B2
(45) Date of Patent: May 4, 2010

(54) OPTOCERAMICS, OPTICAL ELEMENTS MANUFACTURED THEREOF AND THEIR USE AS WELL AS IMAGING OPTICS

(75) Inventors: Ulrich Peuchert, Bodenheim (DE); Yvonne Menke, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 12/117,024

(22) Filed: May 8, 2008

(65) Prior Publication Data

US 2008/0278823 A1 Nov. 13, 2008

(30) Foreign Application Priority Data

May 8, 2007 (DE) .................. 10 2007 022 048

(51) Int. Cl.
*G02B 3/00* (2006.01)
*C03C 10/00* (2006.01)

(52) U.S. Cl. ................ 359/642; 501/1; 501/2; 501/6; 501/8; 501/11; 501/41; 501/64; 501/69; 501/900; 65/33.1; 423/263

(58) Field of Classification Search .......... 501/1, 501/2, 6, 8, 11, 41, 64, 69, 900; 65/33.1; 423/263; 359/642
See application file for complete search history.

(56) References Cited

U.S. PATENT DOCUMENTS

| | | | |
|---|---|---|---|
| 6,908,872 B2 | 6/2005 | Tanaka et al. | |
| 7,291,571 B2 | 11/2007 | Sprenger et al. | |
| 7,324,285 B2 * | 1/2008 | Reichel et al. | 359/642 |
| 2006/0166804 A1 | 7/2006 | Sprenger et al. | |
| 2007/0091472 A1 * | 4/2007 | Alkemper et al. | 359/796 |
| 2008/0194396 A1 | 8/2008 | Kintaka | |

FOREIGN PATENT DOCUMENTS

| | | |
|---|---|---|
| CN | 1587196 | 3/2005 |
| DE | 102 45 234 | 4/2004 |
| DE | 10 2006 045 072 | 3/2007 |
| JP | 2000-203933 | 7/2000 |
| WO | 2007/049434 | 5/2007 |
| WO | 2007/060816 | 5/2007 |

OTHER PUBLICATIONS

"The Properties of Optical Glass" Bach, Hans; Neuroth, Norbert (HRSG.), Berlin (U.A): Springer, 1995. (Schott Series on Glass and Glass Ceramics: Science, Technology, and Applications; 1) , XVII, 410 p. -2, Corr. Print., 1998, XVII, 414 S.

(Continued)

*Primary Examiner*—Evelyn A. Lester
(74) *Attorney, Agent, or Firm*—Michael J. Striker

(57) ABSTRACT

The transparent polycrystalline optoceramic has single crystallites and at least 95 percent by weight of the single crystallites have a cubic pyrochlore or fluorite structure. The optoceramic is composed of an oxide of stoichiometry:

$$A_{2+x}B_yD_zE_7$$

wherein $0<x<1$, $0<y<2$, $0<z<1.6$ and $3x+4y+5z=8$; wherein A is at least one trivalent rare earth cation; B is at least one tetravalent cation; D is at least one pentavalent cation; and E comprises at least one divalent anion. Refractive, diffractive or transmissive optical elements are made with these optoceramics.

21 Claims, 1 Drawing Sheet

OTHER PUBLICATIONS

Malkin et al "Optical Spectroscopy of Yb2Ti2O7 and Y2Ti2O7: YB3+ and Crystal-Field Parameters in Rare-Earth Titanate Pyrochlores." Physical Review B 70. 075112 (2004).

S. A. Saltykov, "Stereometrische Metallographie", Deutscher Verlag Fuer Grundstoffindustrie, Leipzig, 1974.

Mouzon, J. "Synthesis of Yb:Y2O3 Nanoparticles and Fabrication of Transparent Polycrystalline Yttria Ceramic" Lulea University of Technology, Int. No. 2005:29. ISSN: 1402-1757.

Terki et al: "Full Potential Linearized Augmented Plane Wave Investigations of Structural and Electronic Properties of Pyrochlore Systems", J. Appl. Phys., vol. 96 (11) pp. 6482-6487 (2001).

M. A. Subramanian et al: "Oxide Pyrochlores—A Review" Prog. Solid. St. Chem., vol. 15, pp. 55-143 (1983).

Klimin et al: "Stark Structure of the Yb3+ Ion Levels in (Ybx Y1-x)2Ti2O7 and the Crystal Field in Rare-Earth Titanates With a Pyrochlore Structure" Physics of Solid State vol. 47, No. 8, (2005).

Ji et al: "La2Hf2O7:Ti4+ Ceramic Scintillator for X-Ray Imaging" J. Mater. Res., vol. 20 (3) pp. 567-570 (2005).

Ji et al: Fabrication of Transparent La2Hf2O7 Ceramics From Combustion Synthesized Powders Materials Research Bulletin 40 (2005) pp. 553-559. (2004).

Ji et al: "Preparation and Spectroscopic Properties of La2Hf2O7:Tb" Materials Letters, 59 (8-9): pp. 868-871 APR (2005).

L.G. Shcherbakova et al: "Lanthanide Titanates" Russian Chemical Reviews, 48 pp. 423-447, (1979).

K. N. Portnoi et al: Synthesis and Study of the Properties of Complex Oxides of the Rare Earths and Hafnium Izvestiya Akademii Nauk SSSR, Neorganicheskie Materialy, vol. 6, No. 1, 91 (Jan. 1970). Original Article Submitted Feb. 11, 1969. UDC 546.65'21+546.832'21.

Technical Information Advaced Optics, TIE-35: Transmittance of Optical Glass, Oct. 2005, pp. 1-12 (In English).

* cited by examiner

US 7,710,656 B2

OPTOCERAMICS, OPTICAL ELEMENTS MANUFACTURED THEREOF AND THEIR USE AS WELL AS IMAGING OPTICS

BACKGROUND OF THE INVENTION

The present invention refers to optoceramics and refractive, transmissive or diffractive optical elements manufactured thereof their use as well as imaging optics. These optoceramics and optical elements are permeable to visible light and/or infrared radiation. The optoceramics consist of a crystal network, i.e. of polycrystalline material.

An optoceramic according to the present invention is understood to be highly transparent material that is essentially single phase, polycrystalline and based on an oxide. Optoceramics are thus a special subdivision of ceramics. "Single phase" in this context is understood to mean that at least more than 95% by weight of the material, preferably at least 97% by weight, further preferred 99% by weight and most preferred 99.5 to 99.9% by weight of the material are present in the form of crystals of the desired composition. The individual crystals are arranged densely and, relative to the theoretical density, they have densities of at least 99% by weight, preferably at least 99.9% by weight, further preferred at least 99.99% by weight. Accordingly, the optoceramics are nearly free of pores. The use in imaging optics refers mainly to the use of the optoceramics according to the present invention in shapes that have curved surfaces at the entry and exit position of light, i.e. preferably lens shapes.

Optoceramics are distinguished from conventional ceramics by the fact that conventional ceramics comprise high proportions of amorphous glass phase next to the crystalline phase. Similarly, within conventional ceramics the high densities of optoceramics may not be achieved. Neither glass ceramics nor conventional ceramics may exhibit the advantageous properties of optoceramics like certain refractive indexes, Abbe numbers, values for relative partial dispersion and particularly the advantageous high transparency for light in the visible and/or infrared spectral range.

"Transparency in the visible spectral range" in context of the present invention is supposed to represent a pure transmission (i.e. the transmission less reflection losses) within a range of at least 200 nm width, for example a range from 400 to 600 nm, a range of from 450 to 750 nm or preferably a range from 600 to 800 nm, in the visible light region with wavelengths of 380 nm to 800 nm of above 70%, preferably of >80%, further preferred of >90%, particularly preferred of >95% at a layer thickness of 2 mm, preferably even at a layer thickness of 3 mm, particularly preferred at a layer thickness of 5 mm.

Pure transmission in % above a certain percentage means to be a percentage based on the pure transmission that can theoretically be achieved, i.e. no reflection loss at all.

"Transparency in the infrared spectral range" in context of the present invention is supposed to represent a pure transmission (i.e. the transmission less reflection losses) within a range of at least 1000 nm width, for example a range of from 1000 to 2000 nm, a range of from 1500 to 2500 nm or further preferred a range of from 3000 to 4000 nm, in the infrared spectral range with wavelengths of from 800 nm to 5000 nm of above 70%, preferably of >80%, further preferred of >90%, particularly preferred of >95% at a layer thickness of 2 mm, preferably even at a layer thickness of 3 mm, particularly preferred at a layer thickness of 5 mm.

Ideally, the material exhibits a transmission (including reflection losses) of more than 20% at a layer thickness of 3 mm and in a wavelength range of more than 200 nm width between 5000 nm and 8000 nm.

The optical elements obtainable from the optoceramics as described herein are particularly suitable for use in imaging optics like for example objectives with reduced colour aberrations, especially with approximately apochromatic imaging properties. The optical elements manufactured from optoceramics according to the present invention are usable within lens systems in association with lenses of glass and other ceramic lenses as well, especially also in digital cameras, mobile phone cameras, in the field of microscopy, microlithography, optical data storage or other applications in the sectors of consumer and industry applications.

The main target in the development of imaging optics is a sufficient optical quality while maintaining compact and preferably light construction of the optical system. Especially for applications in digital image capturing within electronic devices like for example digital cameras, objectives in mobile phones and the like, the optical imaging system must be very small and light. In other words, the total number of imaging lenses must be kept as low as possible.

In the area of microscopy nearly diffraction limited imaging optics are needed for the ocular as well as the objective.

For the sector of military defense transparent optical systems are needed, which preferably show high transmissions in the visible wavelength region (380 to 800 nm) as well as in the infrared up to 8000 nm, ideally up to 10000 nm. Furthermore these optical systems must be resistant to external attack like mechanical influence, like for example collision, temperature, change in temperature, pressure etc.

For many other technologies like for example digital projection and further display technologies also highly transparent material is needed. But also in mainly monochromatic applications like optical storage technologies compact systems can be realized by application of material with high refractive index.

Today, development of imaging optics is limited by optical parameters of the available material. With the glass melting and moulding techniques, which are available today, only such glass types can be produced with high quality that are located in an Abbe diagram, in which the refractive index is plotted against the Abbe number, underneath a line that runs through the points Abbe number=80/refractive index=1.7 and Abbe number=10/refractive index=2.0. More precisely, glasses with refractive indices between about 1.9 and about 2.2 and an Abbe number in the range of from about 30 to about 40 tend to be unstable so that it is very difficult to manufacture such glasses in high amounts and sufficient quality. Similarly, glasses with refractive indices of between about 1.8 and 2.1 and an Abbe number in the range of from about 30 and 55 tend to be unstable.

Next to refractive index and Abbe number the relative partial dispersion is also important when choosing optical material. If one intends to produce nearly apochromatic optical systems, the combination of material with almost equal relative partial dispersion but a big difference in Abbe number becomes necessary. If the partial dispersion $P_{g,F}$ is plotted against Abbe number (FIG. 2b), most glasses lie on a line ("normal line"). Desirable are hence materials, in which the combination of Abbe number and relative partial dispersion deviates from this behaviour.

The definitions of refractive index $n_d$, Abbe number $v_d$ and relative partial dispersion $P_{g,F}$ are known to the person skilled in the art and can be understood by studying the relevant technical literature. In the sense of the present invention the expressions are used according to the definitions in "The properties of optical glass; Bach, Hans; Neuroth, Norbert (Hrsg.), Berlin (u.a.): Springer, 1995.—(Schott series on glass and glass ceramics: science, technology, and applications; 1), XVII, 410 p.-2., corr. Print., 1998, XVII, 414 S".

Material that is located above the line in the Abbe diagram mentioned before, are at this time only single crystals or polycrystalline material. The production of single crystals with the known crystal breeding techniques, however, is very expensive especially for high melting components, because of the very expensive breeding crucible material; further this method is subject to limitations with respect to chemical compositions. Furthermore, crystals cannot be produced in a near-netshape or near-netformat manner, resulting in significant postprocessing effort.

$R_2Ti_2O_7$ single crystals can show high refractive indices (see Shcherbakova et al., Russ. Chem. Rev. 48, 423 (1979)). The production of single crystals is, as indicated above, very expensive and does not render manufacture of larger optical elements possible. It must be said here that the data for polycrystalline materials in the article of Shcherbakova only refer to values of micro hardness. The article K. N. Portnoi et al., Izvestiya Akademii Nauk SSSR, Neorganicheskie Materialy, Vol. 6, No. 1, 91 (1970) does not contain any data or hints on refractive indices of polycrystalline material.

The crystals that are for example described in Malkin et al. Phys. Rev. B 70, 075112 (2004) are made from $Yb_2Ti_2O_7$ and are obtainable via Floating Zone Methods in large individuals. The thicknesses are indicated as being up to 1.5 mm.

Although polycrystalline ceramics are obtainable in a wide range of compositions, they usually show insufficient optical quality, especially as far as homogeneity of refractive index and transmission is concerned. By now only few composition ranges and structure types are known that provide for transparent ceramics with sufficient optical quality.

For example the Japanese laid-open patent application JP 2000-203933 discloses the production of polycrystalline YAG by application of a certain sintering process. Disadvantages of YAG for passive linear optical applications are the position in the Abbe diagram or $P_{g,F}$-diagram ($n_d$=1.83, Abbe number=52.8; $P_{g,F}$=0.558; delta $P_{g,F}$=0.0031), which is not "exotically" enough and does not suffice for most applications. The YAG system as such us furthermore disadvantageous, because although chemical variability is high, the structure only accepts trivalent cations. The possibilities of variation (tuning) of the optical properties, which are besides other factors influenced by the UV band gap structure, are therefore not sufficient for many purposes.

In the U.S. Pat. No. 6,908,872 a translucent ceramic material is described, which utilizes barium oxide as obligatory oxide in the ceramic. The thus obtained ceramics show Perovskite structure and are para-electric. However, ceramics comprising such barium containing phases with perovskite structure often show insufficient optical imaging quality. This results from the tendency of many perovskites to build out distorted ferro-electrical crystal structures and thus loose their optical isotropy. This leads inter alia to an undesired birefringence of the crystals, from which the ceramic is made. Furthermore, transmission in the blue spectral region (wavelength around 380 nm) is insufficient.

Transparent ceramics of the composition $La_2Hf_2O_7$ (LHO) are known from Ji et al., "Fabrication of transparent $La_2Hf_2O_7$ ceramics from combustion synthesized powders", Mat. Res. Bull. 40 (3) 553-559 (2005)". Therein powders of the target composition are used that have been obtained by combustion reactions. Only such ceramics are obtained that show transparencies of 70% at sample thicknesses of <1 mm, which is too little for optical applications. $Ti^{4+}$-comprising, active $La_2Hf_2O_7$ as transparent ceramic material for scintillator applications is known from Ji et al., "$La_2Hf_2O_7$:$Ti^{4+}$ ceramic scintillator for x-ray imaging" J. Mater. Res., Vol. 20 (3) 567-570 (2005) as well as from CN 1 587 196A. 0.5 at %-5 at % $Tb^{3+}$-doped active LHO as transparent ceramic material is described in Ji, Y M; Jiang, D Y; Shi, J L in "Preparation and spectroscopic properties of $La_2Hf_2O_7$:Tb" (MATERIALS LETTERS, 59 (8-9): 868-871 APR 2005). These active, i.e. light emitting, lanthanum compounds are not suitable for the desired application as passive, i.e. not light emitting, elements, i.e. in the form of lenses.

DE 10 2006 045 072 A1 describes an optical element including a single phase optoceramic. However, the materials are of cubic structure of the $ZrO_2$ type which is stabilized by $Y_2O_3$. Such crystal structures are different from a stable cubic pyrochlore or stable fluorite structure.

Klimin et al in "Physics of solid state. Vol. 47, No. 8, 2005" describes single crystal materials and polycrystalline compounds, however does not address optical grade transparency of any polycrystalline material. Polycrystalline material is in the form of pressed powder that is slightly consolidated at quite low temperatures not higher than 1400° C. This procedure cannot result in a material with optical properties.

WO 2007/060816, which was published after the priority date of the present invention addresses translucent ceramics. A refractive optical element in the present invention is understood to be an optical element, in which electromagnetic rays are refracted at the interface to the optical element, because of the property of the optical element to consist of an optically thinner or optically thicker material than the vicinity. Preferably, the present description refers to optically refractive elements that behave "imaging refractive", i.e. they comprise an entry and an exit surface of the optically denser body that is curved in a lens shape. Thus deflection of the light ray after passing the element is achieved.

SUMMARY OF THE INVENTION

A transmissive optical element according to the present invention has the property of letting electromagnetic radiation pass through. The ray intruding into the optical element at a certain angle, assuming coplanarity and thus missing curvature at the entry and exit surface of the element, exits the element at the same angle. This means that electromagnetic radiation does not change its direction while passing through a purely transmissive optical element.

A diffractive optical element (DOE) in the sense of the present invention is an element comprising at least one surface, which surface comprises structures in the size range of the wavelength of the electromagnetic radiation, which structures implement optically effective functions. These structures are for example holographic grates or holograms implementing optical functions or a Fresnel zone plate. Those structures have high refractive effectiveness over their whole cross section.

It is the object of the present invention to provide optoceramic material with high refractive index and/or high Abbe number and/or an excellent, special relative partial dispersion, which properties cannot be achieved with conventional glasses, single crystal material or polycrystalline ceramics or materials. According to another aspect of the present invention the claimed material family shall have preferably high variability in the sense of substitution of metal ions of different valency so that optical properties can be varied in wide ranges. Furthermore, a cost-effective production of the optoceramic material shall be possible.

According to a further aspect of the present invention an optical element shall be provided from the above-indicated material, which preferably shows high and above all steady transmission characteristics in the visible and/or infrared wavelength region. Furthermore, an optical imaging system comprising an optical element made of such material shall be provided.

The above object is solved by a polycrystalline optoceramic, wherein at least 95% by weight, preferably at least 98% by weight of the single crystallites show cubic pyrochloror fluorite structure, wherein the optoceramic has a pure transmission within a wavelength range of from 600 nm to 800 nm at a sample thickness of 2 mm, preferably at a thickness of 3 mm that is above 80%, comprising an oxide of the stoichiometry:

$$A_{2+x}B_yD_zE_7, \text{ wherein}$$

$0 \leq x \leq 1$ und $0 \leq y \leq 2$ und $0 \leq z \leq 1.6$ as well as $3x+4y+5z=8$ and wherein A is at least one trivalent cation from the group of rare earth metal oxides, preferably Y, Gd, Yb, Lu, La, Sc B is at least one tetravalent cation, especially Ti, Zr, Hf, Sn and/or Ge, D is at least one pentavalent cation, especially Nb and/or Ta and E is at least one anion that is essentially divalent.

The indication that E is at least one anion that is essentially divalent means that E can be replaced by one anion or more than one anion on the one hand and that this anion or these anions for the most part, i.e. by at least 90 at %, preferably at least 95 at %, particularly preferred at least 98 at % comprise divalent anions, preferably O or S on the other hand. The rest, up to 10 at %, preferably up to 5 at %, particularly preferred up to 2 at %, may be anions with different valency, preferably monovalent anions. As monovalent anions the group of the halogen ions is particularly preferred, especially the anions of the group F, Cl and Br.

In a preferred embodiment it is true that $E=O_{1-n}S_n$ and $n \leq 0.5$.

The claimed optoceramics preferably have the general stoichiometry $A_2^{3+}B_2^{4+}E_7$, wherein A preferably is a trivalent cation selected from the group of rare earth ions, they preferably have a stoichiometry that comprises the non-colouring oxides of Y, Gd, Yb, Lu, Sc, La.

Furthermore, $B^{4+}$ is preferably a tetravalent ion from the group Ti, Zr, Hf, Sn or Ge with Ti being preferably present in the optoceramic.

In the position of B there may also be pentavalent cations like $Nb^{5+}$ or $Ta^{5+}$. As a consequence the position of B may only be half-occupied by $D^{5+}$ in pyrochlore phases, the second half is occupied by a trivalent cation, like for example a rare earth ion, preferably Y, La, Gd, Yb, Lu, Sc. The general formula then is $A1_2^{3+}A2^{3+}D^{5+}E_7$ or, if $A1^{3+}=A2^{3+}$ the result is $A_3^{3+}D^{5+}E_7$.

But also phases with a stoichiometry of $A_3^{3+}D^{5+}E_7$ or $A_2^{3+}B_2^{4+}E_7$ with cubic fluorite structure are claimed.

In such compositions of preferred embodiments, in which the components A, B, D and/or E are built by more than one cation or anion, the resulting composition is a stable mixed crystal phase with cubic pyrochlore or fluorite structure.

The family of the pyrochlores is exceptionally extensive. The crystal structure is cubic and accepts a large number of isotypical and substitutions with different valencies on the position of A as well as B. Depending on ion radii compositions of the stoichiometry $A_2B_2E_7$ or $A_3DE_7$ optionally crystallize as orthorhombic Weberite-type, monoclinic Perowskite-type, cubic fluorite type or cubic pyrochlore type. Only the last-mentioned cubic systems are claimed as optoceramics or their application as lenses.

An overview over the multitude of compositions with pyrochlore structure can be found in "Oxide Pyrochlores—A review" by Subramanian et al. (Prog. Solid. St. Chem. Vol. 15, p. 55-143 (1983)).

The optoceramics according to the present invention consisting of cubic grains (crystals, crystallites) with pyrochlore or fluorite structure of the general formula $A_2^{3+}B_2^{4+}E_7$ or $A_3^{3+}D^{5+}E_7$ are manufactured by sintering at least one oxide or a mixture of rare earth oxides, preferably oxides of the type $A^{3+}_2O_3$ with $A^{3+}=Y$, Gd, Yb, Lu, La, Sc; of the type $B^{4+}O_2$ with $B^{4+}=Ti$, Zr, Hf, Sn, Ge and of the type $D_2^{5+}O_5$ with $D^{5+}=Nb$, Ta.

It is essential herein that the ratios of the components of the mixture are chosen such that the cubic structures of the pyrochlore or fluorite relating to the compositions $A_2^{3+}B_2^{4+}E_7$ or $A_3^{3+}D^{5+}E_7$ are preserved. In the scope of this invention a ceramic with cubic structure is such a ceramic, which consists of a matrix of crystals, wherein the single crystals have cubic structures. Preferably, the material consists of more than 95% of the cubic phase, further preferred by more than 98% of the cubic phase, more preferred by more than 99% of the cubic phase.

Every mixed crystal phase shows cubic crystal structure, isotypical to that of $Y_2Ti_2O_7$ or $La_2Zr_2O_7$ (pyrochlore) or $Y_3NbO_7$ (Fluorite). These structure types are, for example, described in Terki et al.: "Full potential linearized augmented plane wave investigations of structural and electronic properties of pyrochiore systems", J. Appl. Phys. Vol. 96(11)6482-6487 (2001).

The crystallites, from which the polycrystalline optoceramics of the present invention are composed, have cubic crystal structure. This leads to an isotypical birefringence-free optical behaviour. They have dielectric properties, i.e. due to their cubic structure no permanent dipoles occur and the material is optically isotropic. Hence, also the optical properties are isotropic.

Furthermore, the crystallites of the polycrystalline optoceramics according to the present invention preferably have an average particle diameter of more than 500 nm, particularly preferred more than 1000 nm. Herein, the average particle diameter (or average grain diameter) is understood to be the average particle diameter as determined according to S. A. Saltykov, "Stereometrische Metallographie", Deutscher Verlag für Grundstoffindustrie, Leipzig, 1974.

According to the present invention the above problem is solved by a refractive, transmissive or diffractive optical element comprising the above-described optoceramic. Preferably, such an element is present as a lens, i.e. the imaging of an object is only made possible by this object.

According to another aspect of the present invention an optical imaging system with lenses is provided, said system comprising at least two different transparent materials, wherein at least one lens is manufactured from an optoceramic as explained above. The invention thus starts from the insight that by application of two differently transparent lens materials within an optical imaging system, like for example an objective, novel imaging properties can be provided. Especially the possibility of achromatisation of the optical imaging system is made possible with a comparatively low number of refractive optical elements, which effect could not be achieved by application of conventional glass types. As an example it is thought about application of in total only three refractive optical elements for construction of a compact objective with approximately apochromatic imaging properties. In total, the present invention makes it possible to provide optical imaging systems for correction of chromatic aberrations with very low weight, low depth of installation space and low costs, which are compact when compared to multi-lens systems according to the state of the art.

Therein, according to another aspect of the present invention, the lenses can be constructed as being purely refractive. The lenses can be aligned solitarily or with certain distances towards each other. Some lenses can basically be incorporated into a group of lenses, for example as a lens duplet or lens triplet etc.

According to a further alternative aspect of the present invention at least one lens can have diffractive structures, which structures are for example embossed, pressed or written into the surface or the volume of the lens, like for example in the form of Fresnel zone plates, diffraction gratings—also blazed diffraction gratings.

According to another preferred embodiment of the present invention, the optical imaging system comprises at least one lens made from glass, thus the optical imaging system comprises a lens manufactured from transparent optoceramics as described before and a lens made from a matched glass.

The above-described lenses can be incorporated into a compact objective with a predetermined focal distance. According to a further embodiment of the present invention, the first lens on the object side of the optical imaging system can be purely refractive, preferably a spherical lens.

As predominantly transmissive optical element the optoceramic can be used as a transparent protection element, preferably a window or visor.

BRIEF DESCRIPTION OF THE DRAWING

In the following the present invention is described exemplarily with reference to the accompanying figure, thereby further features, advantages and problems to be solved become apparent.

DESCRIPTION OF THE PREFERRED EMBODIMENTS

Figure 1:
FIG. 1 shows four examples of optical elements manufactured from the optoceramics according to the present invention.
Figure 1:
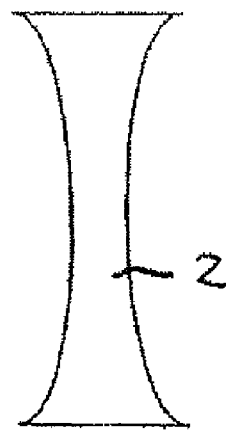
Figure 1:
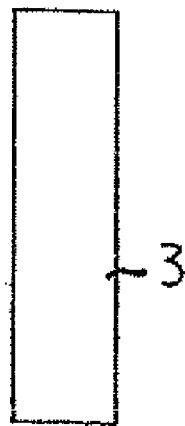
Figure 1:
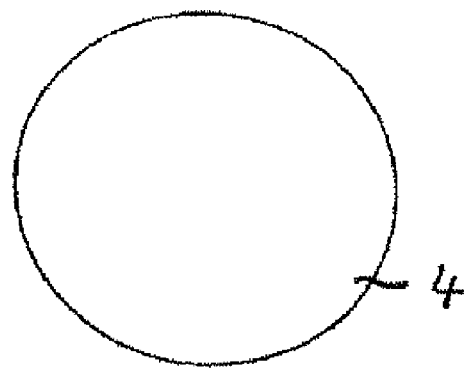

The four examples of transmissive and/or refractive optical elements according to the present invention shown in FIG. 1 comprise a biconvex lens 1, a bio-concave lens 2, a purely transmissive optical element 3 and a spherical lens 4. The indicated lenses 1, 2 and 4 are preferred applications of the optoceramics according to the present invention with regard to the optical elements.

As described in the following, the optoceramics according to the present invention are transparent materials with refractive indexes $n_d$ above or equal to about 1.90, preferably between about 2.0 and about 2.7, particularly preferred between about 2.1 and about 2.7. Most preferred is a refractive index of above 2.25 and even more preferred above 2.30. An Abbe number concurrently is in the range of from about 10 to about 45, preferably between about 10 and 40, particularly preferred between about 12 and 35. This facilitates novel combinations of materials for use in achromatisation of lens systems.

All of the claimed optoceramics are mixed systems, i.e. they consist of at least two cations of different valency (positions of A, B, D). The stoichiometry of the oxidic powder batch or of the finished compound powder must hence be exactly oriented to this stoichiometry. Ideally, the compositions only differ in the range of up to 10 mol %, ideally up to 5 mol % from the target compositions. Otherwise a further undesired phase (with different refractive index or different structural symmetry other than the cubic) may come up during sintering. For some target phases mixed crystal phases result, i.e. under-/overdose of one of the oxides is compensable by the crystal structure.

These are for example the phases $La_2Zr_2O_7$ and $La_2Hf_2O_7$, the phase diagrams of which (Phase Diagram for Ceramists; No. 5232) show mixed crystal areas in a magnitude of up to 25 mol % (i.e. −12.5%/+12.5%) around the target stoichiometry. With $La_2Hf_2O_7$ this is according to the phase diagram (Phase Diagram for Ceramists; No. 2371) about 20 mol %±10 mol %. Even if mixed crystal phases are missing, the production of the optoceramics with high qualities is possible (see as a comparison for example YAG; Phase Diagram No. 2344).

Examples for materials are (the second column of the following list indicates the respectively realized structure of the respective optoceramics):

$Y_2Ti_2O_7$ cubic pyrochlore phase $Yb_2Ti_2O_7$ cubic pyrochlore phase $Lu_2Ti_2O_7$ cubic pyrochlore phase $La_2Zr_2O_7$ cubic pyrochlore phase $La_2Hf_2O_7$ cubic pyrochlore phase $Gd_2Zr_2O_7$ cubic pyrochlore phase $Gd_2Ti_2O_7$ cubic pyrochlore phase $Gd_2Hf_2O_7$ cubic pyrochlore phase $Gd_2(Gd,Nb)O_7 = Gd_3NbO_7$ cubic pyrochlore phase $Gd_2(Gd,Ta)O_7 = Gd_3TaO_7$ cubic pyrochlore phase $Y_3TaO_7$ cubic fluorite phase $Y_3NbO_7$ cubic fluorite phase $Y_2Zr_2O_7$ cubic fluorite phase $Yb_2Zr_2O_7$ cubic fluorite phase $Y_2Hf_2O_7$ cubic fluorite phase $Yb_2Hf_2O_7$ cubic fluorite phase All of the materials have cubic crystal structure. Mixture of A-, B- and D-cations in their respective positions is also possible, this is true for example in $(Yb,Y)_2Ti_2O_7$, $La_2(Hf,Zr)_2O_7$ and $(La,Gd)_2(Hf,Zr)_2O_7$. Also the arrangement of three different elements at a single position is possible, which facilitates a multiplicity of possibilities to adjust refractive indexes and dispersions.

Also mixtures of two or more terminal elements are possible, which elements as single components have different structures, namely either cubic pyrochlore or cubic fluorite structure (for example $Y_2Ti_2O_7$: pyrochlore and $Y_2Zr_2O_7$: fluorite structure).

Also variants are possible with three or more than three cations.

The oxides that can be applied according to the present invention form compositions, which usually do not show optical activity in the visible spectral region, i.e. at about 380 to 800 nm, i.e. light in this spectral region is neither absorbed nor emitted. The ceramics are usually essentially uncoloured, fluorescence is not present.

For the passive elements according to the present invention (for example lenses), a possible fluorescence must be suppressed purposefully. This is warranted by use of raw material with exceptionally high purity. The content of optically active impurity (for example active ions from the group of rare earth elements (RE) or transition metals) is according to an embodiment of the pre-sent invention to be reduced to a minimum. This is preferably <100 ppm, further preferred <10 ppm, particularly preferred <1 ppm and most preferred the optoceramics are free of such ions, like Pr, Nd, Sm, Eu, Tb, Dy, Ho, Er, Tm.

By adequate combination of the oxides the optical properties like transparency, refractive index, Abbe number and partial dispersion can be adjusted to the respective prerequisites.

Preferably, the refractive indexes of the optoceramics according to the present invention are in the range of above or equal to about 1.9, further preferred between about 2.0 and about 2.7, particularly preferred between about 2.1 and about 2.7, the Abbe number is between about 10 and about 45, preferably between about 10 and about 40, particularly preferred between about 12 and about 35.

According to the present invention the values of the pure transmissions of the optoceramics differ in a wavelength range of from 600 nm to 800 nm, preferably in the wavelength region of 500 nm to 800 nm by up to about 10% when compared to the value of pure transmission at 600 nm. The transmissions of the optoceramics according to the present invention are hence very steady in the wavelength region that is preferred for their use.

Production of the optoceramics according to the present invention:

Particularly preferred the optoceramics according to the present invention are manufactured by sintering oxides (reactive sintering of the single components). This route is simple and cost-effective and is readily adaptable to the desired optical parameters of the developed optoceramics. The production via this route implements the steps as described in more detail in the following. These steps are powder production, powder conditioning, moulding and annealing. Preferably, further processing steps like for example a HIP step may follow.

Preferably, sintering is carried out in vacuum. Powder beds are usually to be avoided. According to preferred embodiments of processes for producing the optoceramics as described herein a further sintering in a hot isostatic press takes place.

1. Powder Production

The production of the optoceramics is done by application of appropriate powders. Methods for this are (co-) precipitation, flame hydrolysis, gas condensation, laser ablation, plasma spray methods (CVS method), sol-gel method, hydrothermal methods, combustion etc. With respect to high packing densities the grain shape is preferably round or preferably spherical, the grains are only loosely connected to each other by van der Waals forces (soft agglomerates). The grains are ideally only connected to each other by weak bridges in the form of sinter necks. Referring to chemical precipitations there is a great dependency of the grain fraction and shape from the precipitation conditions. The choice of precipitation media (carbonate precipitation, hydroxide precipitation, oxalate precipitation) of for example a nitrate or chloride solution of for example Y-nitrate (yttrium nitrate) or Y-chloride (yttrium chloride) makes production of a broad spectrum of starting powders possible. Also different drying methods of the dry sludge (simple air drying, lyophilisation, azeotrope distillation) result in different powder qualities and starting properties (like for example specific surfaces). During precipitation furthermore a multitude of further parameters (pH value, stirrer rotation, temperature, precipitation volume etc.) have to be controlled.

Purity of the powder is a crucial criterion. Any impurity can lead to changed sintering conditions or inhomogeneous distribution of optical properties. Impurities can lead to formation of liquid phases, which in the worst case lead to broad inhomogeneous grain boundary regions. The formation of intergranulary phases (amorphous or crystalline) must however be avoided, because these cause differences in refractive index with the consequence that transmission losses due to dispersion will occur upon light pass.

The use of hard agglomerates, i.e. primary particles that build up multiple bridges during precipitation or calcinations or that are more or less baked together due to these circumstances is also possible depending on the applied method. For example J. Mouzon describes in a published licenciate thesis "Synthesis of Yb:$Y_2O_3$ nanoparticles and Fabrication of Transparent Polycrystalline Yttria Ceramic", Lulea University of Technology, Int. No. 2005:29 for the Ytrria system that in order to avoid intergranulary pores, i.e. pores within a grain, differential sintering was of advantage. This is provided by hard agglomerates. Therein the primary particles within an agglomerate sinter densely in a first step, remaining pores are preferably located in the grain boundary regions. These could be removed from the system by applying the method of hot "isostatic pressing".

Upon production of (co-) precipitated powders there furthermore exists the possibility to diminish the tendency towards agglomeration by purposefully adding certain agents. Thereby the necessity of a grinding step is bypassed. For this purpose there exists the possibility of adding $NH_4OH$ before calcinations of a precipitated oxalate suspension.

A far bigger flexibility as far as adjustment and fine-tuning of optical properties by changing compositions are concerned is possible by manufacturing the mentioned optoceramics by reactive sintering. At reactive sintering oxide mixtures are used that react to become the desired component during the sintering process.

2. Powder Conditioning

The powders are processed further differently depending on moulding. As a rule grinding of the powder takes place with the purpose of a) disintegration of pre-sent agglomerates, b) homogenization of the powders, if additives are added. Grinding can be dry or wet, the latter are for example alcohols or water-based media. The times for grinding can reach up to 24 hours, should however be chosen as to avoid abrasion from the grinding elements ($Al_2O_3$, $ZrO_2$) or from the inner lining of the mill. As mills annular gap mills, attritor mills, ball mills etc. are suitable. As media for example water, liquid alcohols or liquid hydrocarbons like heptanes or others can be used.

Drying of the batches however can take place with air at low temperatures, in the most preferred case the grinding suspension is dried via spray drying. Herein granules of defined size and quality can be obtained. During spray drying binders should be used, preferably spray drying leads to soft agglomerates. The agglomerate size should not exceed 100 μm, agglomerates in a size range of from 10 to 50 μm are favourable, agglomerates <10 μm are ideal. Also lyophilization as well as whirling stream drying are possible.

Additives may be needed, if the nanopowder or nanopowder agglomerate is to be pressed. For moulding by casting, for example slip casting, die casting, and centrifugal casting, the powder batch must be dispersed in suitable liquids. For this purpose for example Darvan, Dolapix, polyacrylic acids, ammonium-oxalate-monohydrate, oxalic acid, sorbit-ammonium citrate or others can be used.

For plastic moulding (extrusion, die casting, hot casting) organic binders of the type polyolefine for example HOSTA- MOND® by Clariant or catalytically disintegrating binders like for example of the type CATAMOLD® by BASF have to be added and homogenized in a suitable way.

3. Moulding

On principle, any imaginable ceramic moulding method can be applied. These are the liquid, plastic and dry moulding methods. In detail, the following liquid moulding methods are particularly preferred: slip casting, pressure slip casting, vacuum die casting or gel casting. As plastic moulding methods hot casting, ceramic injection die casting, or extrusion are possible. Dry moulding particularly refers to uniaxial and/or cold isostatic moulding.

The choice of the respective moulding method is geared to the prerequisites of the final product (quality, size, amount) or its desired properties (and thus the composition).

In a preferred embodiment, moulding tools may be used in the moulding step, which moulding tools are design to be near-netshaped, thus avoiding any expense in further processing or at least reducing the same. By this near-netshaping costs are reduced. Such moulds are for example described in the patent application DE 10 2007 002 078.5. The disclosure of this patent application is hereby fully incorporated into this application by reference as far as the optoceramics according to the present invention are concerned.

4. Annealing

Vacuum sintering facilitates removal of open porosity from the compacted powder. Vacuum conditions are above $10^{-3}$ mbar (=$10^{-3}$ hPa), preferably pressures between $10^{-5}$ and $10^{-6}$ mbar (=$10^{-5}$ to $10^{-6}$ hPa) are applied. The sintering conditions vary with the respective material. As an example programs with T=1500° C. to 1800° C. and sintering times between 1 and 10 hours are mentioned.

Alternatively, sintering may take place in special atmospheres (He, hydrogen (dry or wet), $N_2$, Ar).

During vacuum sintering attention has to be paid to grain growth not being too fast and uncontrolled. It is the aim not to include pores into the grains. For this purpose for example the sintering temperatures should be kept low. The sample may still be opaque afterwards due to the high pore density, but the pores are closed.

By applying a HIP step afterwards the closed porosity in the grain boundaries can be pressed from the system. Exemplary conditions are 1500° C. to 1800° C. and pressures between 100 MPa (1000 bar) and 200 MPa (2000 bar). Annealing times between 1 and 10 hours (without heating and cooling phases) are usual. As heating element W and Mo, possibly also graphite, can be used.

As pressure gas argon can be used. In order to avoid solution of argon in the grain boundaries, for example in vitrified intermediate phases, the sample can be encapsulated or embedded in specific powder. Thereby, colourations by reduction of material on the surfaces or contamination of the sample by the heating element in the oven can be avoided, "tempering follows" in air is not necessary. If yet tempering follows were necessary, it should take place in air or oxygen. Exemplary conditions are 1 to 48 hours at up to 1400° C.

By conducting a special process also the intragranulary fine porosity can be diminished. This happens by purposeful grain growth, which takes place such that newly build grain boundaries grow over the area of pore volume included into the grain. For this purpose the sample undergoes another sintering process after the HIP step.

Instead of vacuum sintering with following HIP step, also the combined step of "vacuum hot pressing" can be applied.

Manufacturing of the ceramic with powder of the target composition, obtained for example by Flame Spray Pyrolysis or co-precipitation is also possible.

In the following some examples for production of the mentioned optoceramics are mentioned. The examples are not supposed to limit the scope of this invention, material and methods can be changed if necessary.

1. Example for Manufacturing a Transparent Ceramic from $Y_2Ti_2O_7$ by Dry Pressing (Reactive Sintering)

Powder with primary particles with diameters <1 µm, preferably nanoscale size (<100 nm) of $Y_2O_3$ and $TiO_2$ are weighed in the proportions of the target composition and mixed or homogenized in a ball mill. Grinding takes place in ethanol with $ZrO_2$ balls, wherein the grinding suspension additionally comprises a binder, surface sensitive additives etc. Grinding takes place during the night.

The grinding suspension is optionally dried on a heater or a spray drier.

The powder is afterwards uniaxially pressed to discs, preferably the moulds are designed such that at least one surface has the contour of the desired lens. Pressure conditions are between 10 and 50 MPa, pressure times are between some seconds to 1 min. The preform is redensified in a cold isostatic press, wherein pressure is between 100 and 300 MPa. The pressure conducting medium is water.

Afterwards binder is combusted in a first thermal step. Annealing time and temperature are 90 min and 600° C. The combusted green body is afterwards sintered in a vacuum sintering oven (low-pressure: $10^{-5}$ to $10^{-6}$ mbar), optionally sintering takes place in hydrogen or helium. Sintering temperatures and times are geared to the melting points and phase transformation temperatures of the target compositions. In the case of $Y_2Ti_2O_7$ these conditions are about 1500° C./3 h. The target composition is formed in this thermal step.

In subsequent hot isostatic pressing (HIP) closed pores are removed. HIP conditions are for example at 1700° C.-60 min-Ar-200 MPa. Depending on chemism and sensitivity of the system to reduction, the sample can afterwards be reoxidised in a further thermal step (for example 900° C., 5 hours, air).

Optically transparent and homogeneous bodies are obtained that can be processed further to obtain lenses.

2. Example for the Production of a Transparent Ceramic from $Gd_2Zr_2O_7$ by Centrifugal Die Casting (Reactive Sintering)

Powder with submicron (<1 µm), preferably nanoscale (<100 nm) primary particles of $Gd_2O_3$ or $ZrO_2$ are weighed in the proportions of the target composition. Afterwards the components are mixed in a ball mill to obtain a slip of nanoscale ceramic powder (35% by weight), solvent (51% by weight water), dispersant (5% by weight carbonic acid ester), binder (4% by weight PVA), plasticizer (4.5% by weight glycerol, ethylene glycol and polyacrylate), defoaming agent (0.25% by weight) and tenside (0.25% by weight). Afterwards the obtained mass is transferred into the centrifuge and centrifuged at 300 rotations per minute until the whole mass has settled on the bottom of the plastic (PMMA) container, then centrifugation is carried on for another 15 minutes. The bottom of the centrifugation container can be of lens shape. Deforming and combustion of the binder is done at 700° C. with a heating rate of 100 K/h and dwell time of 8 h. Vacuum sintering takes place at $10^{-5}$ to $10^{-6}$ mbar with a heating rate of 300 K/h up to 1300° C. and a dwell time of 10 h. In this step the target composition $Gd_2Zr_2O_7$ is formed. HIP is performed afterwards with a heating rate of 300 K/h up to 1500° C. and a dwell time of 10 h and a pressure of 200 MPa. Afterwards post annealing is performed at a temperature of 1100° C. in air and a heating rate of 150 K/min.

3. Example for the Production of a Transparent Ceramic from $Gd_2(Hf, Zr)_2O_7$ by Hot Casting (Reactive Sintering)

In a heated ball mill the ceramic nanoscale $Gd_2O_3$, $ZrO_2$—$HfO_2$ powder mixture is mixed with the thermoplastic binder (mixture of 75% by weight paraffin and 25% by weight of nanoscale wax) and the surface active ingredient siloxan polyglycolether (single molecular coverage of the ceramic particle surface) at 80° C. Therein the viscosity of the final slip is 2.5 Pas with a solid particle content of 60 vol %. With a casting pressure of 1 MPa the slip is transferred directly into the plastic mould (hot casting). Expulsion of the binder is done after deforming above the melting point of the applied wax, wherein about 3% by weight remain in the green compact, in order to provide for the required stability. The binders and tensides remaining in the green compact are combusted during the subsequent sintering step. Vacuum sintering takes place with a heating rate of 300 K/h up to 1300° C. and a dwell time of 10 h. In this step the target composition $Gd_2(Hf,Zr)_2O_7$ is formed. The vacuum conditions are between $10^{-5}$ to $10^{-6}$ mbar. HIP takes place with a heating rate of 300 K/min up to 1500° C. and a dwell time of 10 h at a pressure of 200 MPa. Post annealing takes place at a temperature of 1100° C. in air with a heating rate of 150 K/h.

4. Example for the Production of a Transparent Ceramic from $Y_3(Nb,Ta)O_7$ by Uniaxial Pressing Powder with submicron (<1 μm), preferably nanoscale (<100 nm) primary particles of $Y_2O_3$, $Nb_2O_5$ and $Ta_2O_5$ are weighed in the proportions of the target composition and mixed or homogenized in a ball mill. Grinding takes place in ethanol with $ZrO_2$ balls, wherein the grinding suspension furthermore comprises binder, surface sensitive additives etc. Grinding takes place over night. The grinding suspension is optionally dried on a heater or the suspension is granulated in a spray drier.

The powder is pressed to discs uniaxially, preferably the moulds are shaped such that at least one surface has a contour of the final lens. The pressure conditions are between 10 and 50 MPa, pressure times are a few seconds up to 1 min.

The preform is redensified in a cold isostatic press, wherein the pressure is between 100 and 300 MPa. The pressure medium is water.

Afterwards the binder is combusted in a first thermal step. Annealing time and temperature are between 60 min and 550° C.

The combusted green body is afterwards sintered in a vacuum sintering oven (low-pressure $10^{-5}$ to $10^{-6}$ mbar, optionally in hydrogen or helium). Sintering temperatures and times are geared to the melting points and phase transformation temperatures of the target composition. In case of $Y_3(Nb,Ta)O_7$ these conditions are 1450° C./3 h. The target composition is formed in this thermal step.

In subsequent hot isostatic pressing the closed pores are removed. HIP conditions are for example 1600° C.-60 min-Ar-200 MPa. Depending on chemism and sensitivity of the system to reduction, the sample can be reoxidised in a further thermal step (for example 800° C., 5 hours, air).

In the end optically transparent and homogeneous bodies are obtained that can be further processed to lenses. The optoceramics according to the present invention can be processed to obtain optical elements in a near-netshape way by application of the production process as described in the patent application DE 10 2007 002 079.3. By this reference the content of the mentioned older patent application is incorporated into the present application.

5. Example for the Production of a Transparent Ceramic from $Yb_2Ti_2O_7$ by Uniaxial Pressing (Including Reactive Sintering)

Powder with primary particles with diameters <1 μm, preferably nanoscale size (<100 nm) of $Yb_2O_3$ and $TiO_2$ are weighed in the proportions of the target composition. The target composition can vary from $Yb_2O_3$-rich to $TiO_2$-rich pyrochlor phases. After addition of dispersant and binder the batch is mixed with ethanol and $ZrO_2$ balls in a ball mill for 12 to 16 hours.

The grinding suspension is optionally dried on a heater or a spry drier.

The powder is afterwards uniaxially pressed to discs, preferably the moulds are designed such that at least one surface has the contour of the desired lens. Pressure conditions are in the range of 10 to 50 MPa, pressure times may last some seconds up to one minute. The preform is redensified in a cold isostatic press, wherein pressure is between 100 and 300 MPa. The pressure conducting medium is water or oil.

Afterwards binder is combusted in a first thermal step. Annealing times and temperatures are in the range of from 1 to 3 hours and between 600 and 1000° C. The combusted green body is afterwards sintered in a vacuum sintering oven (low-pressure: $10^{-5}$-$10^{-6}$ mbar (hPa)), optionally sintering takes place in hydrogen or helium. Sintering temperatures and times are geared towards the sinter properties of the batch i.e. after formation of the composition the further compression to a ceramic with less or no pores takes place. In the case of $Gd_2Hf_2O_7$ the pyrochlor phase is built at temperatures being in the range of 1000° C., mostly above 1000° C. Sintering to a nearly nonporous body occurs at even higher temperatures, between 1600 and 1800° C. with a sintering time in the range of from 2 to 10 hours.

In subsequent hot isostatic pressing (HIP) closed pores are removed. HIP conditions are for example at 1780° C. for a time of about 2 hours under argon at 200 MPa (abbreviated as above done with 1780° C.-2 h-Ar-200 MPa). Depending on chemism and sensitivity of the system to reduction, the sample can afterwards be reoxidised in a further thermal step (for example at 1000° C., for 5 hours, using $O_2$-flow).

Optically transparent and homogeneous bodies are obtained that can be processed further to obtain lenses.

The invention claimed is:

1. A polycrystalline optoceramic comprising single crystallites, wherein at least 95 wt. % of the single crystallites have a cubic pyrochlore or fluorite structure and a 2 mm sample of the optoceramic has a pure transmission of more than 80% in a wavelength range of 600 to 800 nm, and said optoceramic comprises an oxide of stoichiometry:

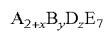

$$A_{2+x}B_yD_zE_7$$

wherein $0 \leq x \leq 1$, $0 \leq y \leq 2$ and $0 \leq z \leq 1.6$;
wherein $3x+4y+5z=8$;
wherein
 A is at least one trivalent rare earth cation;
 B is at least one tetravalent cation;
 D is at least one pentavalent cation; and
 E comprises at least one divalent anion.

2. The polycrystalline optoceramic as defined in claim 1, wherein said at least one trivalent rare earth cation is selected from the group consisting of $Y^{+3}$, $Gd^{+3}$, $Yb^{+3}$, $Lu^{+3}$, $Sc^{+3}$ and $La^{+3}$.

3. The polycrystalline optoceramic as defined in claim 1, wherein said at least one tetravalent cation is selected from the group consisting of $Ti^{+4}$, $Zr^{+4}$, $Hf^{+4}$, $Sn^{+4}$ and $Ge^{+4}$.

4. The polycrystalline optoceramic as defined in claim 1, wherein said at least one tetravalent cation is $Ti^{+4}$.

5. The polycrystalline optoceramic as defined in claim 1, wherein said at least one pentavalent cation is selected from the group consisting of $Nb^{+5}$ and $Ta^{+5}$.

6. The polycrystalline optoceramic as defined in claim 1, wherein said oxide has the stoichiometry $A_2B_2E_7$ or $A_3DE_7$.

7. The polycrystalline optoceramic as defined in claim 1, wherein said E is $S_nO_{1-n}$ and $n \leq 0.5$.

8. The polycrystalline optoceramic as defined in claim 1, wherein said E comprises up to 10 at. % of at least one halogen anion selected from the group consisting of F, Cl and Br.

9. The polycrystalline optoceramic as defined in claim 1, wherein said pure transmission varies by up to about 10% from a pure transmission value at 600 nm in said wavelength range.

10. The polycrystalline ontoceramic as defined in claim 1, having a refractive index of from about 1.9 to about 2.7 and an Abbe number of from about 10 to about 45.

11. The polycrystalline optoceramic as defined in claim 1, which is transparent to visible light, transparent to infrared light, or transparent to both said visible light and said infrared light.

12. A transparent protective element in the form of a window or a visor, said transparent protective element comprising an optoceramic as defined in claim 1.

13. A refractive, transmissive or diffractive optical element, comprising an essentially single phase optoceramic;
    wherein said optoceramic comprises single crystallites, wherein at least 95 wt. % of the single crystallites have a cubic pyrochlore or fluorite structure and a 2 mm sample of the optoceramic has a pure transmission of more than 80% in a wavelength range of 600 to 800 nm, and said optoceramic comprises an oxide of stoichiometry:

$A_{2+x}B_yD_zE_7$ wherein $0 \leq x \leq 1$, $0 \leq y \leq 2$ and $0 \leq z \leq 1.6$;
wherein $3x+4y+5z=8$;
wherein
    A is at least one trivalent rare earth cation;
    B is at least one tetravalent cation;
    D is at least one pentavalent cation; and
    E comprises at least one divalent anion.

14. The optical element as defined in claim 13, consisting of a lens.

15. An optical imaging system comprising at least two lenses made of at least two different transparent materials;
    wherein at least one of said at least two lenses is made from an essentially single phase optoceramic, said optoceramic comprises single crystallites, wherein at least 95 wt. % of the single crystallites have a cubic pyrochlore or fluorite structure and a 2 mm sample of the optoceramic has a pure transmission of more than 80% in a wavelength range of 600 to 800 nm, and said optoceramic comprises an oxide with a stoichiometry:

$A_{2+x}B_yD_zE_7$ wherein $0 \leq x \leq 1$, $0 \leq y \leq 2$ and $0 \leq z \leq 1.6$;
wherein $3x+4y+5z=8$;
wherein
    A is at least one trivalent rare earth cation;
    B is at least one tetravalent cation;
    D is at least one pentavalent cation; and
    E comprises at least one divalent anion.

16. The optical imaging system as defined in claim 15, wherein at least one of said at least two lenses is purely refractive.

17. The optical imaging system as defined in claim 15, wherein at least one of said at least two lenses has diffractive structures.

18. The optical imaging system as defined in claim 15, wherein said at least two lenses comprise said at least one of said at least two lenses made from said essentially single phase optoceramic and at least one other lens made of glass.

19. The optical imaging system as defined in claim 15, further comprising a compact objective with a predetermined focal distance and said compact objective comprises said at least two lenses.

20. The optical imaging system as defined in claim 15, having an objective side and wherein said at least two lenses comprise a first lens and said first lens is located on said objective side and is purely refractive.

21. The optical imaging system as defined in claim 20, wherein said first lens is a spherical lens.

* * * * *